US005574990A

United States Patent [19]
Flanagan

[11] Patent Number: 5,574,990
[45] Date of Patent: Nov. 12, 1996

[54] PREDISTORTION TECHNIQUE FOR COMMUNICATIONS SYSTEMS

[75] Inventor: Richard T. Flanagan, Freehold, N.J.

[73] Assignee: Lucent Technologies Inc., Murray Hill, N.J.

[21] Appl. No.: 559,888

[22] Filed: Nov. 20, 1995

Related U.S. Application Data

[63] Continuation of Ser. No. 67,902, May 27, 1993, abandoned.
[51] Int. Cl.$^6$ ................................................ H04B 17/00
[52] U.S. Cl. .............................. 455/115; 455/63; 455/69; 455/83; 375/296
[58] Field of Search ............................... 455/63, 673, 69, 455/88, 24, 15, 305, 116, 67.4, 115; 375/224, 257, 296

[56] References Cited

U.S. PATENT DOCUMENTS

| | | | |
|---|---|---|---|
| 4,368,362 | 1/1983 | Chung et al. | 379/3 |
| 4,561,111 | 12/1985 | Conner | 455/69 |
| 4,679,225 | 7/1987 | Higashiyama | 379/58 |
| 4,994,675 | 2/1991 | Levin et al. | 455/617 |
| 5,251,328 | 10/1993 | Shaw | 455/63 |

*Primary Examiner*—Andrew Faile
*Assistant Examiner*—Doris To
*Attorney, Agent, or Firm*—Thomas Stafford

[57] ABSTRACT

The problem of noise enhancement is eliminated in communications systems by predistorting the amplitude of the transmitted information signal in a manner which compensates for the amplitude distortion introduced in a portion of the communications channel. In the disclosed embodiments, the communications system includes two signal transceivers which communicate with one another through a communications channel. The communications channel includes two-wire subscriber loops adjacent to each signal transceiver with a four-wire transmission path disposed between the subscriber loops. Each transceiver transmits an information signal which, depending on the system noise characteristics, is predistorted to compensate for all or a portion of the amplitude distortion introduced in a subscriber loop adjacent to that signal transceiver. The predistortion necessary to provide such compensation is determined at each transceiver in response to a received narrowband signal at that transceiver. Advantageously, this narrowband signal may be that used to disable echo cancellers and/suppressors in the communications channel.

18 Claims, 2 Drawing Sheets

5,574,990

PREDISTORTION TECHNIQUE FOR COMMUNICATIONS SYSTEMS

This application is a continuation of application Ser. No. 08/067,902, filed on May 27, 1993 now abandoned.

TECHNICAL FIELD

The present invention relates to communications systems and, more particularly, to a technique for compensating for distortion introduced in a portion of a communications channel.

BACKGROUND OF THE INVENTION

Distortion compensation can be categorized as being either postdistortion or predistortion compensation or a combination of both. Postdistortion compensation is compensation that is provided after distortion is introduced into an information signal while predistortion compensation is compensation for distortion prior to the introduction of the distortion.

In many communications applications, the application of known distortion compensation techniques results in signal noise enhancement. This results from the fact that the information signal is subjected to more distortion than the noise. One example of this is in dial-up modem applications, where the communications channel includes two-wire subscriber loops, each having an associated amplitude versus frequency distortion characteristic, and a four-wire transmission system therebetween. Most of the signal noise is introduced in the four-wire transmission system. Accordingly, any information signal propagating through the communications channel is subjected to amplitude distortion within both subscriber loops while the noise is only subjected to amplitude distortion within one subscriber loop. The process of using linear equalizers to compensate for the distortion to which the information signal has been subjected results in overequalization or enhancement of the noise signal.

The problem of noise enhancement is not severe for typical voice and low-speed data applications. However, as the data rate increases, such noise enhancement becomes intolerable as it substantially interferes with attainment of required bit error rates. Accordingly, compensation for such noise enhancement is required.

One prior art technique for addressing noise enhancement involves the use of decision feedback equalizers in each receiver to "whiten", i.e., provide a substantially flat amplitude-versus-frequency spectrum for the noise at the equalizer output. The problem with this technique is that a decision feedback equalizer is an inherently complex device to implement and is subject to error propagation. Another technique, known as the "Tomlinson" technique, is to adapt a decision feedback equalizer using a priori known data, thereby eliminating the problem of error propagation, and then transmitting the coefficients of this equalizer to a remote transmitter wherein such coefficients are used to predistort the transmitted signal. The shortcoming of this technique is that it requires the availability of an error-free communications channel for coefficient transmission. Such a channel is not always available when required.

More recently, another technique, disclosed in patent application Ser. No. 07/630,636, filed Dec. 20, 1990 now U.S. Pat. No. 5,251,328 issued to D. G. Shaw on Oct. 5, 1993 and assigned to the present assignee, addresses the problem of noise enhancement and error propagation by predistorting the transmitted information to compensate for less than all of the distortion introduced in the communications channel. This technique involves the transmission of a signal having a frequency spectrum at least as wide as that of the information signal to be transmitted through the communications channel during a predesignated time period and the analysis of the error signal from an adaptive filter for determining the appropriate amount of predistortion. While this arrangement provides satisfactory performance, the need for an adaptive filter and associated circuitry for analyzing the error signal may increase implementation costs beyond the desired cost objectives. In addition, an allocation of the required predesignated time period may not be available.

Accordingly, it would be desirable if a distortion compensation technique could be devised which addresses the problem of noise enhancement and does not have the limitations associated with the prior art.

SUMMARY OF THE INVENTION

Broadly speaking, the present invention addresses the problem of noise enhancement by determining the distortion introduced within a portion of a communications channel between two signal transceivers. This is accomplished by processing a signal received from the communications channel and then using the results to predistort a transmitted information signal to compensate for all or a part of the determined distortion. This technique is based on the recognition that noise, either produced by signal coding or temperature, i.e., thermal noise, is a wideband signal.

In accordance with the disclosed embodiments of the present invention, a signal having a frequency spectrum substantially narrower than that of associated information signal is transmitted and after receipt is processed and used to predistort the information signal to compensate for less than all of the distortion introduced in a communications channel. More particularly, the signal transmission involves coding which produces quantization noise and it is this noise which is analyzed to determine all or less than all of the distortion introduced in one of a plurality of distortion-introducing communications channel portions. In the disclosed embodiments, the distortion compensated for relates to that introduced in a section of the communication channel adjacent to the receiver. Advantageously, the signal whose quantization noise is analyzed may be one which is commonly used to disable echo cancellers in existing applications thereby avoiding the need to allocate time intervals for the determination of the appropriate amount of predistortion compensation.

DETAILED DESCRIPTION

Figure 1:
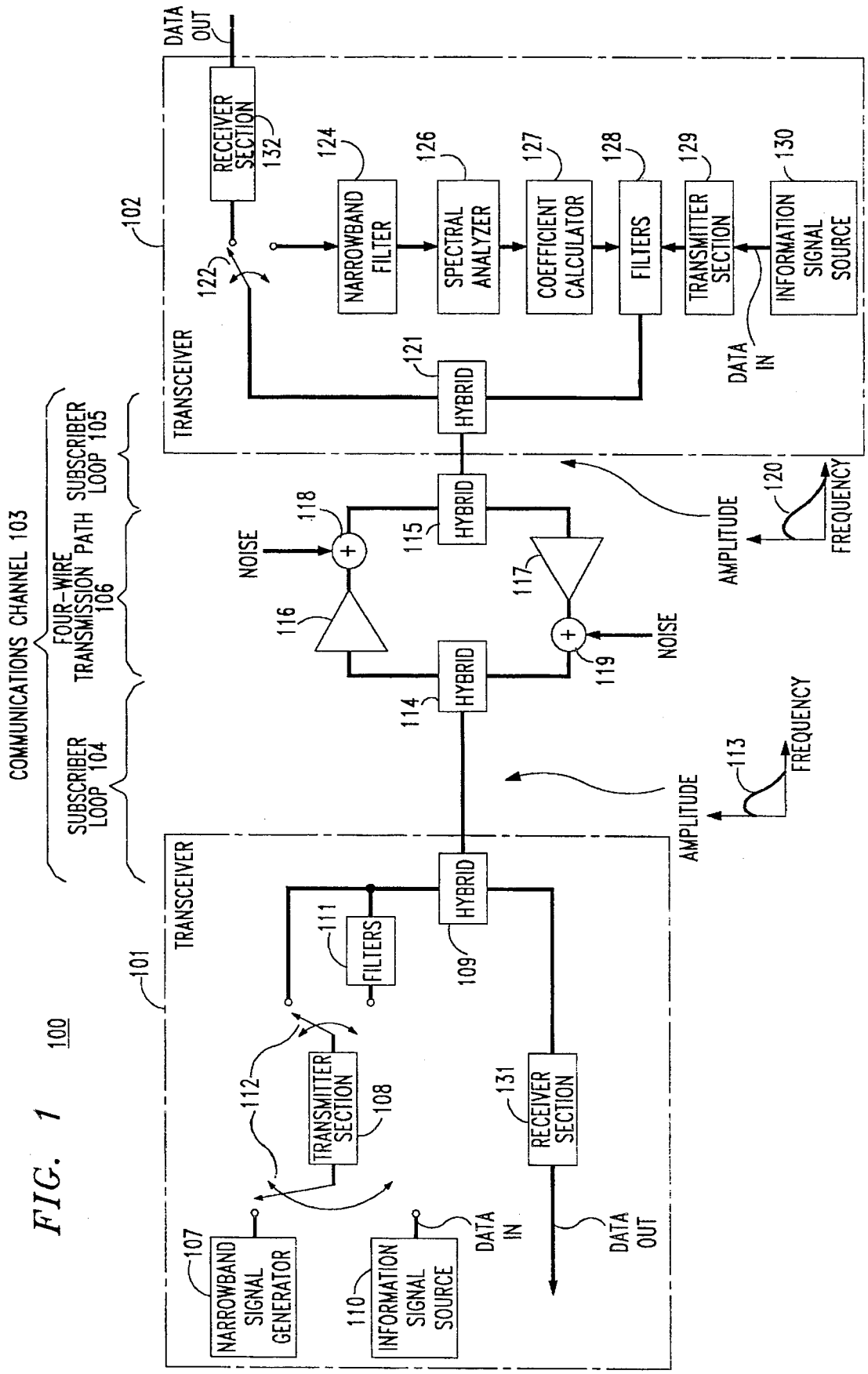
FIG. 1 is a block-schematic diagram of a communications system implementing a first embodiment of the present invention.

In the exemplary bidirectional communications system 100 shown in FIG. 1, which incorporates the present invention, transceivers 101 and 102, each incorporated within a dial-up modem (not shown), communicate with one another via communications channel 103. Communications channel 103 includes subscriber loops 104 and 105 which are each a two-wire communications path and are respectively connected to transceivers 101 and 102. Channel 103 also includes a four-wire signal transmission path 106 disposed between the aforesaid subscriber loops. Pursuant to the disclosed embodiment of the present invention, signals received at each transceiver of communications system 100 are processed to determine the amplitude distortion introduced within the adjacent subscriber loop. The determined amplitude distortion is then processed and used to predistort the signals transmitted from the distortion-determining transceiver. For purposes of simplicity, the present invention will be described in reference to determining the predistortion required for signals transmitted from transceiver 102 to transceiver 101 which, depending on the system noise characteristics, compensates for all or a portion of the distortion introduced within subscriber loop 105. Of course, an identical technique can be used to predistort the signals transmitted from transceiver 101 to transceiver 102 so as to equivalently compensate for the distortion introduced within subscriber loop 104.

To predistort the amplitude of the signal transmitted from transceiver 102 to transceiver 101, the amplitude distortion introduced in subscriber loop 105 must first be determined. To accomplish this, in accordance with the present invention, at each of one or more predetermined time intervals, e.g., during system start-up or at subsequent times, a signal having a frequency spectrum substantially smaller than that of the information signal to be transmitted between transceivers 101 and 102, hereinafter referred to as a narrowband signal, is transmitted. This narrowband signal is coupled from signal generator 107 through the transmitter section 108 of transceiver 101 to hybrid 109 and thence to subscriber loop 104. At other times, an information signal from information signal source 110 is coupled to transmitter section 108 and thence spectrally shaped by filters 111 before being coupled to hybrid 109. Double-pole-double-throw switch 112 provides the selective coupling of either the narrowband signal or the information signal through the aforementioned apparatus. Hybrid 109 operates in well-known fashion to provide a two-to-four wire signal interface between transceiver 101 and subscriber loop 104. Advantageously, the narrowband signal provided by generator 107 has a substantially flat amplitude spectrum over its frequency spectrum and this signal may be the 2100 Hz signal commonly transmitted in data application to disable any echo cancellers or suppressors in the communications channel.

Subscriber loop 104 has an associated amplitude-versus-frequency distortion characteristic which selectively attenuates the amplitude of any signal coupled therethrough. This characteristic, designated by reference numerals 113 in FIG. 1, predominantly attenuates the coupled signal at higher frequencies and also attenuates, to a lesser extent, frequencies close to dc. The attenuation characteristic is substantially the same for both directions of transmission over subscriber loop 104.

Four-wire signal transmission path 106 includes a pair of hybrids 114 and 115 and amplifiers 116 and 117. Path 106 can also be symbolically represented as including summing nodes 118 and 119 to reflect the fact that while the amplitude-versus-frequency characteristic of path 106 is substantially flat, most of the noise in communications channel 103 is injected by path 106 into the signal coupled in either transmission direction. This noise can be from a variety of sources, such as quantization noise in digital four-wire systems or thermal noise in analog four-wire systems. Each of hybrids 114 and 115 in path 106 serves as a two-to-four-wire interface for its adjacent subscriber loop and each amplifier provides unidirectional transmission in analog transmission systems and is representative of codecs in digital transmission systems. The coding of the signal provided within each amplifier introduces quantization noise. This noise is a wideband signal, i.e., a signal whose frequency spectrum is equal to or greater than that of the information signal.

After propagating through four-wire transmission path 106, the transmitted signal from transceiver 101 enters subscriber loop 105 and is again subjected to an amplitude-versus-frequency distortion characteristic, designated as 120, which selectively attenuates the amplitude of any coupled signal. Characteristic 120 can be the same or different from characteristic 113 but is typically different due to the fact that each subscriber loop need not have the same length and that even if the lengths are the same, each subscriber loop can be fabricated using signal conductors having a different loss-per-unit length. However, as noted above with respect to characteristic 113, characteristic 120 is substantially the same for signal transmission in either direction over subscriber loop 105.

Within transceiver 102, the noise and amplitude-distorted signals coupled from subscriber loop 105 pass through hybrid 121. During each time interval that the narrowband signal is transmitted from transceiver 101, switch 122 couples the received narrowband signal sequence to filter 124 and thence to spectral analyzer 126. At other times, i.e., at times when the narrowband signal is not transmitted, switch 122 couples the received information signal originally provided by information signal source 110 to receiver section 132 in transceiver 102. Receiver section 132, which is of conventional design and can incorporate echo-cancelling apparatus, recovers the information signal provided by source 110.

The wideband quantization noise introduced by the coding of the narrowband signal includes the noise and amplitude distortion introduced by communications channel 103.

Pursuant to the disclosed embodiment, filter 124 removes the narrowband signal and passes the quantization noise to spectral analyzer 126. Of course, it is understood that filter 124 can be eliminated by having spectral analyzer 126 only examine the amplitude of the quantization noise at a plurality of frequencies where the amplitude of such noise is substantially greater than the amplitude of the narrowband signal. It is recognized that by examining the amplitude vs. frequency characteristic of the quantization noise the amplitude vs. frequency characteristic 120 of subscriber loop 105 can be determined since the quantization noise has only experienced the amplitude distortion of this loop. Once the quantization noise has been analyzed at a plurality of frequencies and characteristic 120 has been determined, the information signal transmitted from transceiver 102 to transceiver 101 can be predistorted to compensate for this distortion so as to minimize the noise enhancement associated with information signals received at transceiver 101. Advantageously, this technique, unlike the prior art, does not require the transmission of coefficients or equivalent information from transceiver 101 to transceiver 102.

The determination of the predistortion for the transmitted signal from transceiver 102, which compensates for all or a portion of the amplitude distortion introduced in subscriber loop 105, is provided by spectral analyzer 126 and coefficient calculator 127. Analyzer 126, using well-known techniques, analyzes the output of filter 124 and determines the characteristic 120 therefrom. By processing this determined characteristic, coefficient calculator 127 generates the coefficients required by transmit filters 128 using well-known procedures for filter design, such as inverse Fourier transforms or the Remez exchange algorithm, to predistort the amplitude of the signal outputted by transmitter section 129. Information signal source 130 provides the information signal to be transmitted by transmitter section 129. This transmitted signal is coupled through communications channel 103, and thence to receiver section 131 in transceiver 101. Receiver section 131 recovers the information signal provided by information signal source 130.

In certain system applications, it is desirable to predistort the transmitted signal from transceiver 102 based on the exact inverse of the determined distortion characteristic 120. Such processing works well when the noise injected by four-wire transmission path 106 is primarily quantization noise. Such quantization noise is introduced in analog-to-digital signal conversion and vice-versa and is therefore inherent in digital transmission systems. In other applications, where the noise is primarily thermal or white noise, the optimal predistortion is less than that provided by an exact inversion of the determined distortion characteristic 120. Indeed, it has been found that for purely white noise the optimal predistortion is that obtained by using fifty percent (in dB) of the inverse of the amplitude versus frequency differential of characteristic 120. This optimal white noise predistortion can be readily provided by adjusting the output provided by spectral analyzer 126.

Figure 2:
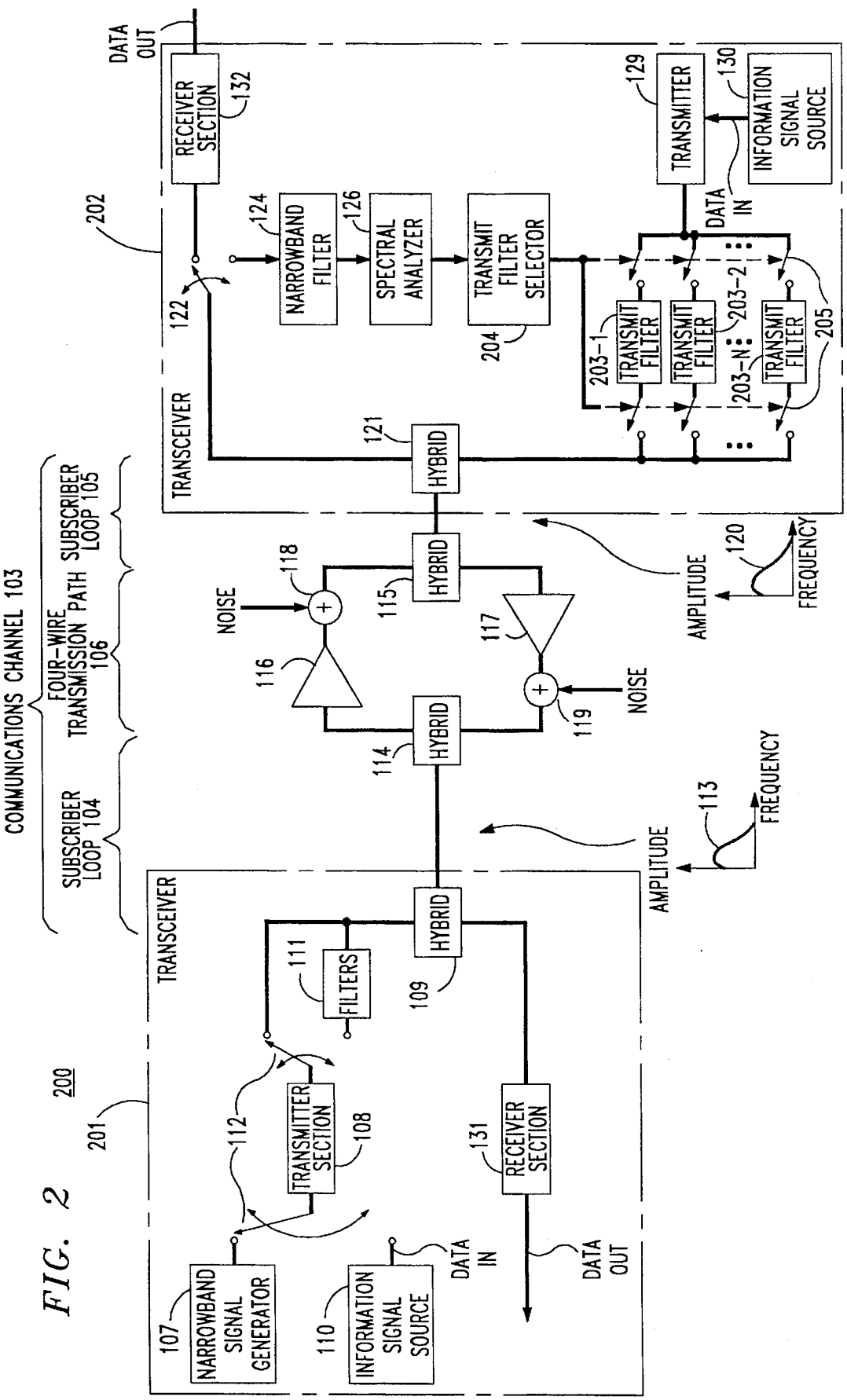
FIG. 2 is a block-schematic diagram of a communications system implementing a second embodiment of the present invention.

FIG. 2 shows an alternate embodiment of the present invention which functions in a substantially identical manner to FIG. 1 except that any transceiver which predistorts its transmitted signal is designed with a plurality of transmit filters. FIG. 2 shows transceiver 202 with a plurality of transmit filters 203-1 through 203-N, where N is a predetermined integer. Each of the transmit filters has a different predetermined filter characteristic. With this filter arrangement, instead of determining the filter coefficients for a transmit filter, the output of spectral analyzer 126 is processed by transmit filter selector 204 to determine which of transmit filters 203-1 through 203-N provides the optimal amplitude predistortion for signals transmitted from transceiver 102. Again, depending on system noise characteristics, this optimal predistortion can be that which compensates for all or a percentage portion of the amplitude distortion introduced within subscriber loop 105. Once this filter determination is made, the determined filter is serially connected to the output of transmitter portion 127 via multi-pole switch 205. Switch 205 operates in response to control signals provided by transmit filter selector 204.

It should, of course, be understood that, while the present invention has been disclosed in reference to a specifically described embodiment, numerous alternative arrangements will be apparent to those of ordinary skill in the art. For example, while the disclosed embodiments utilize discrete devices, the devices can be implemented using one or more appropriately programmed general-purpose processors or special-purpose integrated circuits or digital processors or an analog or hybrid counterpart of any of these devices. Or, while the present invention has been described with reference to a specific communications channel having a 4-wire path disposed between two 2-wire subscriber loops, it is also applicable to other communications channels wherein the amplitude versus distortion characteristic of a portion of the communications channel is substantially similar for each direction of signal transmission. Or, for example, while in the disclosed embodiment, the signals are coded during their transmission through the communications channel producing quantization noise, the present invention is also applicable to other systems wherein a wideband signal is received due to thermal noise or noise caused by coding which does not quantize a signal. Finally, it is contemplated that the present invention can be coupled with apparatus which examines the communications channel and, when necessary and/or appropriate, selectively transmits and analyzes a signal to determine the proper amount of predistortion compensation.

I claim:

1. Transceiver apparatus having a receiver and a transmitter for use in a communications system wherein a communications channel through which an information signal is transmitted introduces amplitude distortion, said apparatus comprising:

a source of a narrow-band signal having a frequency spectrum substantially narrower than that of said information signal;

means for coding said narrow-band signal and introducing said narrow-band signal into the communications channel to induce quantization noise in a transmission path therein;

means, responsive to said quantization noise appearing at said receiver of said transceiver from said communications channel, for determining the amplitude distortion introduced within a near-end subscriber loop of said communications channel which supplies said quantization noise to said receiver of said transceiver, the quantization noise appearing at said receiver of said transceiver being caused by the propagation of said coded narrow-band signal through said transmission path and said near-end subscriber loop; and means responsive to said determined amplitude distortion for predistorting a transmitted signal from said transmitter of said transceiver.

2. The apparatus of claim 1 wherein said predistorting means predistorts said transmitted signal to compensate for all of said determined amplitude distortion.

3. The apparatus of claim 1 wherein said quantization noise and said coded narrow-band signal each have a respective amplitude and said determining means including means for analyzing said quantization noise wherein said analyzing means examines said quantization noise at a plurality of frequencies where the amplitude of said quantization noise is substantially greater than the amplitude of said narrow-band signal.

4. The apparatus of claim 1 wherein said determining means includes means for separating said narrow-band signal from said quantization noise.

5. The apparatus of claim 1 wherein said predistorting means includes a transmit filter.

6. The apparatus of claim 5 wherein said transmit filter has at least one filter coefficient and said determining means determines said at least one filter coefficient.

7. The apparatus of claim 1 wherein said predistorting means includes a plurality of transmit filters.

8. The apparatus of claim 7 wherein said transmitted signal has an amplitude and said determining means includes means for selecting one of said transmit filters to predistort the amplitude of said transmitted signal.

9. The apparatus of claim 7 wherein said determining means is responsive to said narrow-band signal at least one predetermined time.

10. The apparatus of claim 1 wherein said narrow-band signal is a spectral tone.

11. The apparatus of claim 10 wherein said spectral tone is a 2100 Hz tone.

12. A method for use in a transceiver having a receiver and a transmitter of a communications system wherein a communications channel through which an information signal is transmitted introduces amplitude distortion, said method comprising the steps of:

coding a narrow-band signal having a frequency spectrum substantially less than that of said information signal;

introducing a narrow-band signal into the communications channel to induce quantization noise in a transmission path therein;

determining the amplitude distortion introduced within a near-end subscriber loop of said communications channel in response to said quantization noise appearing at said receiver of said transceiver, said quantization noise being caused by the transmission of said coded narrow-band signal through the transmission path and said near-end subscriber loop of said communications channel; and predistorting a transmitted signal from said transmitter of said transceiver in response to said determined amplitude distortion.

13. The method of claim 12 wherein said narrow-band signal is a spectral tone.

14. The method of claim 13 wherein said spectral tone is a 2100 Hz tone.

15. A communications system including first and second signal transceivers, each of said first and second transceivers having a receiver and a transmitter and being connected by a communications channel including a near-end subscriber loop adjacent each of said first and second transceivers which introduces amplitude distortion in a transmitted information signal, said first transceiver comprising:

means for coding a narrow-band signal having a frequency spectrum substantially narrower than that of said information signal;

said transmitter in said first transceiver for transmitting said coded narrow-band signal through said communications channel to induce quantization noise in a transmission path therein, said noise being supplied through said transmission path and said near-end subscriber loop of said communications channel adjacent said second transceiver to said receiver in said second transceiver; and said second transceiver comprising means, responsive to said quantization noise received via said receiver at said second transceiver caused by the propagation of said coded narrow-band signal through said transmission path and said subscriber loop of said communications channel adjacent said second transceiver, for determining the amplitude distortion within said subscriber loop of said communications channel adjacent said second transceiver, and means for predistorting a transmitted signal from said transmitter of said second transceiver in response to said determined amplitude distortion.

16. The transceiver apparatus of claim 15 wherein said narrow-band signal is a spectral tone.

17. The apparatus of claim 15 wherein said narrow-band signal is a spectral tone.

18. The apparatus of claim 17 wherein said spectral tone is a 2100 Hz tone.

\* \* \* \* \*